Jan. 3, 1961  R. P. GUTTERMAN  2,967,119
ULTRASONIC PROCESS AND APPARATUS
Filed Sept. 8, 1958  3 Sheets-Sheet 1

INVENTOR
ROBERT P. GUTTERMAN

BY Cushman, Darby & Cushman
ATTORNEYS

Jan. 3, 1961  R. P. GUTTERMAN  2,967,119
ULTRASONIC PROCESS AND APPARATUS
Filed Sept. 8, 1958  3 Sheets-Sheet 2

INVENTOR
ROBERT P. GUTTERMAN
BY Cushman, Darby & Cushman
ATTORNEYS

Jan. 3, 1961   R. P. GUTTERMAN   2,967,119
ULTRASONIC PROCESS AND APPARATUS
Filed Sept. 8, 1958   3 Sheets-Sheet 3
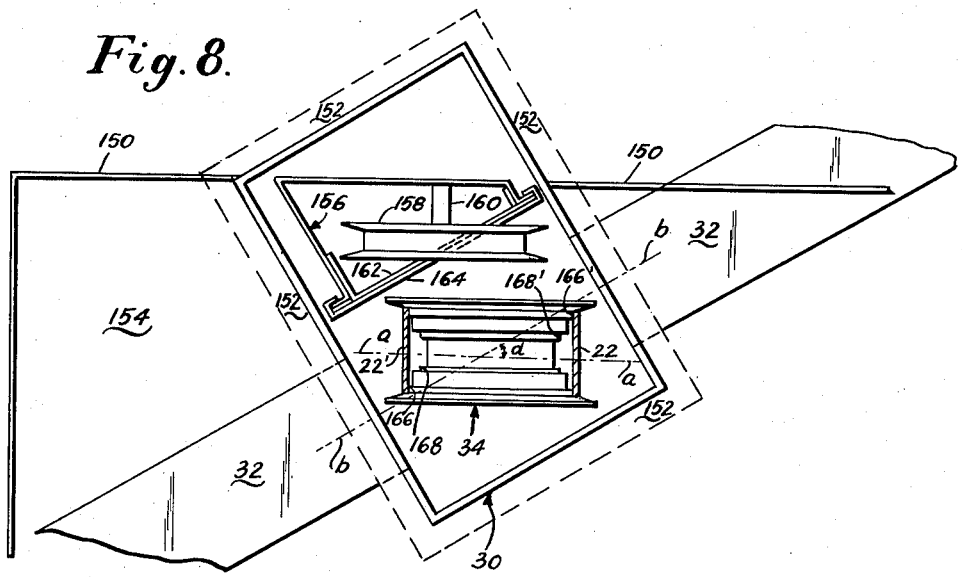
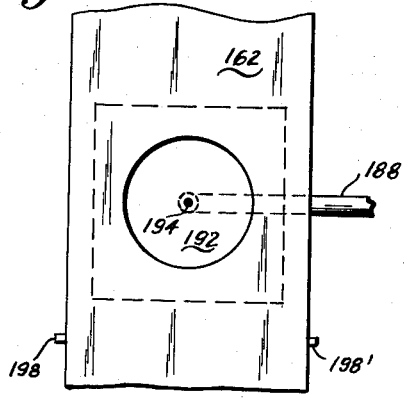
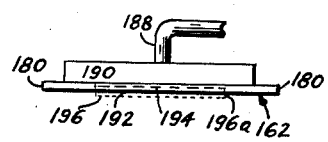
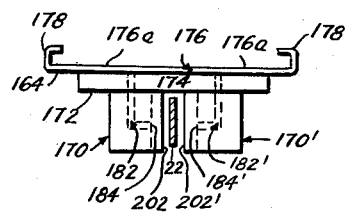
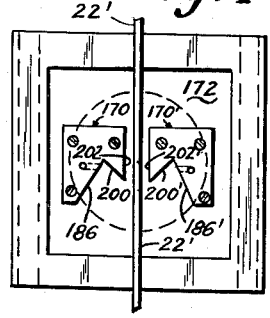
INVENTOR
ROBERT P. GUTTERMAN
BY Cushman, Darby & Cushman
ATTORNEYS United States Patent Office 2,967,119
Patented Jan. 3, 1961

2,967,119

ULTRASONIC PROCESS AND APPARATUS

Robert P. Gutterman, Bethesda, Md., assignor, by mesne assignments, to Lipsner Smith Corporation, Chicago, Ill., a corporation of Virginia Filed Sept. 8, 1958, Ser. No. 759,591

28 Claims. (Cl. 134—1)

This invention is generally related to the art of cleaning photographic film which is, in effect, film carrying intelligence in the form of a series of photographs, and is specifically directed to a novel process and apparatus for cleaning strips of photographic film using ultrasonic energy. It is especially adapted for the continuous cleaning of motion picture film strips but can also be used for cleaning, continuously or otherwise, of other types of photographic film such as strips of film from still cameras, particularly when several such strips are attached end to end to each other. Similar applications of this invention will be apparent from the following description.

The cleaning of motion picture film has presented a long-standing problem of great importance to the motion picture film industry. In filming a motion picture, a single original film is obtained and this original film represents the complete product of the investment of great sums of money. Its careful preservation is accordingly exceedingly important. One of the first steps taken after preparation of the original film is to prepare several direct copies, which direct copies are then used to prepare the large number of exhibition prints for actual projection use.

Throughout the copying procedure, it is very important to have the film clean at all times in order to obtain good copy prints. Any defects such as specks of dust or dirt, any grease marks or any scratches on the film negative will be magnified and enhanced (a necessary result of the nature of light propagation). A negative or negative copy which is spotted and blurred will tend to be produced and will not be entirely satisfactory for viewing purposes. It is understandable then that every effort is extended by the film processors to maintain a clean original film and clean direct copies thereof.

This is not an easy task, however, for even in a reel, film will tend to pick up dust particles and during projection thereof dust will be readily picked up from the atmosphere. This collection of dirt is enhanced by the tendency of film to pick up electrical charges during unwinding and rewinding of the film on reels, the film strip acquiring some of the characteristics of a dust precipitator. When the film is rewound, the dirt particles are, of course, embedded between adjacent portions of the inherently soft surfaces of the film backing and emulsion coatings. The winding tensions will tend to cause a certain amount of frictional slipping between adjacent film surfaces and dirt particles therebetween will scratch the film. These scratches result in light scattering just as grease spots will cause light diffusion and consequently the projected image will be blurred and lack the desired definition of the image.

The cleaning of dirt and grease from a film surface is not, however, an easy matter for the same reason that the dirt and grease is such a problem. That is, any normal scrubbing operation will itself scratch the film, and while the use of a liquid medium is necessary to relieve the scrubbing, at the same time it will leave "spots" if not carefully handled. The range of cleaning solvents which may be employed is of course limited by the solubility characteristics of the film itself, but even with those that may be employed the wet or moistened film tends to become softened, as is well known. Consequently, even though mechanical removal of the dirt, as by dabbing with cloth pads, is easiest when the film is moistened, the danger of scratches is increased. Only by careful treatment with moistened pads can the objectionable spots, left by the evaporation of the solvent, be removed.

While increased temperatures may aid in evaporating cleaning solvent from the film surface, increased temperature very directly increases softening of the film, and if too elevated may cause an actual physical warping of the image. This limitation materially reduces the facility with which a solvent will remove grease deposits.

Consequently, there is a real need for an improved film-cleaning method which is safe, economical, rapid, and efficient, and which can be employed in a commercially feasible apparatus of reasonable size and ease of operation.

The present invention provides a novel method and apparatus which accomplish these objectives.

It is therefore an object of this invention to provide an ultrasonic method for cleaning photographic film.

It is also an object of this invention to provide a novel apparatus for the ultrasonic cleaning of photographic film.

Additionally, it is an object of this invention to provide a novel non-evaporative drying process which may be employed with the ultrasonic cleaning process for photographic film.

Still another object of this invention is to provide a novel apparatus for the ultrasonic cleaning and non-evaporative drying of photographic film.

Another object of this invention is to provide a novel process and apparatus for ultrasonic cleaning and non-evaporative drying of photographic film wherein said portion of the film surface is subjected to maximum ultrasonic energy.

Still another object of this invention is to provide a process and apparatus for ultrasonic cleaning of photographic film which will effectively utilize the maximum generated ultrasonic energy at the photographic film surface.

Further objects of the invention wil lappear from the following description thereof.

Referring to the accompanying drawings.

Figure 1:
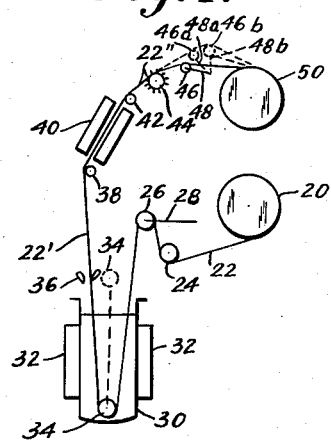
Figure 1 is a schematic representation of one form of apparatus which may be used in this invention.

An alternative method of orienting the film is illustrated in the top view of the cleaning tank shown in Figure 8;

Figures 9 and 10 illustrate, in elevation and top view respectively, a preferred support and sealing disk arrangement for the squeegee plate; and Figures 11 and 12 show, in elevation and top view respectively, a preferred form of and mounting with sealing recess for the spray squeegees.

In order to clarify the major factors involved in ultrasonic cleaning, it may be helpful to review briefly the physical mechanisms involved.

Most liquids contain finely dispersed gases. These may be held in true solution, entrained in molecular form in the quasi-crystalline structure of the fluid, or adsorbed as microscopic bubbles on suspended particles of dust. Wherever such impurities occur, the structure of the liquid is weakened and a nucleus for its rupture is present. If the temperature is raised at constant pressure, approach to the boiling point is first signified by local rupture at such nuclei and attendant release of expanding gas bubbles which coalesce and rise quietly toward the surface. As the temperature is increased, bubbles of true vapor begin to form at the same or similar nuclei. If these bubbles migrate into cooler regions of the liquid, they condense and collapse rapidly, producing an audible hissing sound. Similar effects are noted if the pressure over a liquid is reduced while the temperature is held constant above the critical point.

When intense sound waves are produced in a liquid, closely analogous phenomena occur. When the sound pressure amplitude exceeds the static pressure, the effective local pressure becomes negative during the dilational period of each oscillation. While the theoretical tensile strength of most liquids is extremely high, in the order of 1000 atmospheres, the presence of small bubbles and other rupture nuclei may reduce this value locally to as low as 1 atmosphere. Thus, a negative pressure of this order, occurring once in each cycle of an intense sound wave, can excite effects similar to the onset of low-temperature, low-pressure boiling. Such "cold-boiling" effects are referred to collectively as "cavitation."

As the sound pressure amplitude in a liquid is increased, three forms of cavitation become apparent. When the pressure amplitude just exceeds the static pressure, the larger gas-bubble nuclei expand, coalesce and rise quietly to the surface. This phenomenon, called "quiet degassing," contributes in a minor way to cleaning of immersed objects by lifting away loosely attached particles having relatively large quantities of gas adsorbed on their surfaces. Continued irradiation eventually clears the liquid of these larger bubbles.

As the pressure amplitude is increased further, the average size of released bubbles decreases and their content of molecular vapor of the surrounding liquid increases. They occur in vast quantities, appearing to the eye as foggy streamers. This is called vaporous cavitation. If the sound pressure is stopped, these bubble streamers disappear, as their gas content dissolves and the true vapor present condenses.

When the sound pressure becomes very great, the average bubble size is reduced further, the content of the bubbles becomes largely pure vapor and a wide-band, hissing noise becomes audible. This is due to very rapid, complete collapse of the smaller bubbles during positive pressure periods of the applied sound waves.

A bubble of vapor suspended in a liquid constitutes an acoustic resonator that will vary in diameter roughly in phase with a low-frequency, oscillating pressure field. As the applied sound frequency is increased towards its natural resonant frequency, the amplitude of oscillation and the energy stored in the bubble become quite large. The bubble grows during the negative pressure period and shrinks rapidly during the positive pressure period. As it shrinks, the pressure in the bubble rises very quickly, forcing some of the contained vapor to condense on the bubble wall. The reduction in radius thus becomes unstable and the bubble collapses implosively, releasing all of its stored energy in the form of extremely intense shock waves. The solvent impingement of these local shock waves against dirt particles lodged on an immersed object provides the intense scrubbing action in an ultrasonic cleaning system.

Figure 5:
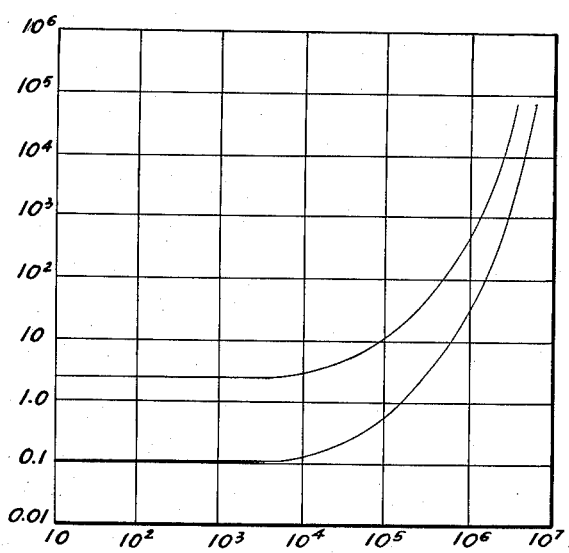
Figure 5 shows the approximate relationship between the applied frequency and sound energy density required to initiate strong cavitation in the solvents employed in this invention, as enumerated hereinafter.

The resonant frequency of a vaporous bubble increases with decreasing diameter. The resonant diameter is about two orders of magnitude smaller than the wavelength of sound in the fluid at the resonant frequency. Since only bubbles that are equal to or smaller than resonant size are capable of rupture and collapse within one pressure cycle, it is obvious that increasing the applied frequency will, statistically, decrease the fraction of bubbles suitable for proper cleaning action. It is fortunate that the intensity of sound required to produce adequate cavitation remains approximately constant and within practical limits well into the ultrasonic frequency range. If this were not the case, and audio frequencies were required, the leakage radiation from a high-powered cleaning system would far exceed the tolerance of a human operator. The approximate preferred region of operation is illustrated in the graph of Figure 5.

To apply these principles to a practical cleaning system for photographic films, it is important that the solvent employed is an efficient cleaner for the particular soils and dirt in question, and that it be inert with respect to the film itself. The typical soils to be removed in the cleaning of photographic film include soluble materials such as oil, grease, smoke, and tar particles, wax pencil, and adhesive tape residue; non-filterable insoluble particles of extremely small size; and the larger, filterable insoluble particles such as chips, lint, granular dirt, and the like. The nature of these soils also leads to particular treatments and elements in the apparatus. Furthermore, the boiling point, surface tension, and acoustic properties of the solvent must permit proper cavitation phenomena. Obviously, fire hazard and toxic levels must also be low.

Among the materials which satisfy the requirement and which may be employed in the present invention are aqueous detergent solutions. These solutions require, however, more specialized care than other solvents which could be used; that is, a closer control of the temperature must be used in order to avoid damage to the film. It is also known that cavitation of aqueous solutions can produce significant quantities of hydrogen peroxide. The attendant possibility of bleaching or other oxidizing effects with respect to the latter factor is a further deterrent to the use of water solutions; however, with proper care they can be employed. It is preferred, therefore, that commercial organic solvents which are known to be reasonably safe for use on color or black and white films be used. Of these stabilized methyl chloroform is presently preferred as offering the best compromise between quality characteristics and cost. Other solvents which may be used include trichloroethylene, perchloroethylene, carbon tetrachloride, and the Freons, trichloromonofluoromethane, dichlorodifluoromethane, dichloromonofluoromethane, monochlorotrifluoromethane, trichlorotrifluoroethane and dichlorotetrafluoroethane, etc. That is, the most suitable solvents comprise these chlorinated and fluorinated lower alkanes, or mixtures thereof.

*General description of apparatus*

To further understand the nature of the instant invention, reference may be made to the accompanying drawings. In the embodiment shown in Figure 1, a film supply reel 20, equipped with an electric brake to provide proper tension, carries the dirty film strip 22 which is unwound therefrom over guide roller 24 and tensioning reel 26 equipped with tension arm 28. Film strip 22 then passes into tank 30 which is equipped with piezoelectric transducers or equivalent electromechanical ultrasonic generators 32. The film is carried around tank guide roller 34 in a helical path such that the emulsion side does not touch any surface and then passes upwardly out of the tank as shown at 22'. At this point, the film passes through a pair of pressure spray rinse nozzles or squeegees 36 which deliver clean solvent to the surface of the film and are operative to wash off part of the dirty solvent carried up from the tank on the film surface, and also to limit the amount of solvent thereafter carried upwards on the film, as will be more fully described hereinafter. The film strip 22' then passes over guide roller 38 through drying chamber 40, which is illustrated in greater detail in Figure 4. On exiting from drier 40, the clean dried film strip 22" passes over guide roller 42, drive sprocket 44, and tensioned guide roller 46 onto take-up reel 50. Guide roller 46 is provided with tensioning arm 48 which also operates as a stop signal device. Guide rollers 38 and 42 control centering of the film in the drier. Guide roller 34 is mounted on vertical slide means, not shown, so that it may be removed upwardly out of the tank to facilitate the initial threading the film strip around it. The combined torque-speed characteristics of the supply reel brake and the take-up reel drive motor cause the film to run in the proper direction, even without engaging the drive sprocket 44; however, the synchronously driven spocket 44 imposes a constant speed on this motion. Since primary drive energy is supplied by the take-up reel motor, forces exerted on the sprocket holes are minimized.

Figure 2:
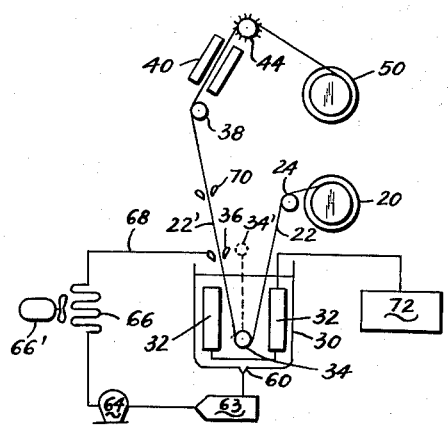
Figure 2 is a schematic representation of another form of apparatus which may be used in this invention.

In Figure 2, a modified apparatus is shown where supply reel 20 is a braked reel and the film strip 22 passes over a guide roller 24 into tank 30, fitted with piezoelectric transducers 32, around tank guide roller 34, mounted on suitable elevator means not shown, for loading position 34', and out of the tank through pressure spray rinse nozzles 36. As shown in this figure, the solvent fed to the spray rinse nozzles 36 is delivered from drain 60 through filter 63 by means of pump 64 through a heat exchanger 66 which may be cooled by a fan 66', or other suitable means, and by line 68 to the nozzles 36. Film strip 22' after passing through nozzles 36 then passes through an air squeegee 70 which is operated to control the surface wetness of the film at the optimum level for passing upwardly over guide roller 38 into the drying chamber 40. This feature assists the efficient operation of the drying chamber. On leaving the drier, film strip 22' is carried over sprocket drive sprocket 44 directly to take-up reel 50. An ultrasonic power generator is schematically shown as 72.

Figure 3:
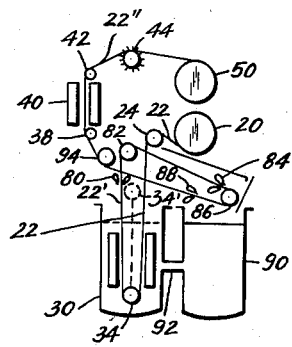
Figure 3 is a schematic representation of still another form of apparatus which may be used in this invention.

Figure 3 illustrates a further embodiment of the invention and shows a more elegant apparatus arrangement. In this figure, film strip 22 is taken off supply reel 20 over guide reel 24 into cleaning tank 30 around tank guide roller 34 (which may again be elevated from the cleaning tank to position 34' for ease of loading). The wet, cleaned strip 22' leaves the tank and passes through an air squeegee 80 over guide roller 82 through cleaning spray nozzles 84 which in this case direct the spray of clean solvent in the same direction as the movement of the film. The film is then passed around guide roller 86 and through a second air squeegee 88. It will be noted that spray nozzles 84, roller 86, and air squeegee 88 are all arranged directly above a settling and reserve solvent tank 90 which is connected to cleaning tank 30 by means of tube 92. This arrangement permits economical collection of the solvent for re-use in the cleaning tank. Tube 92 may be fitted with suitable filtering means (not shown) and tank 90 may contain a thermostatic temperature control device (not shown) to remove the heat generated by the ultrasonic energy. After film strip 22' passes through air squeegee 88, it passes over guide rollers 94 and 38 into drier 40 where the solvent is stripped off, as will be described hereinafter. On leaving the drier, the cleaned, dried film strip 22" passes over guide roller 42 and sprocket drive 44 onto take-up reel 50.

Referring again to Figures 1 and 2, the arrangement and operation of the spray rinse nozzle 36, is very important to the successful commercial operation of the invention. As the film moves upward out of the tank, each surface will carry a layer of the dirty cleaning solvent by natural adhesion. It is important that the bulk of this dirty solvent be removed from the film surface for several reasons. One is to insure proper operation of the non-evaporative dryer device 40, discussed hereinafter, and another is to limit the consumption of solvent. In essence, nozzles 36 operate as a knife-edge squeegee to remove the major portion of the solvent layer, but still leave a thin layer thereof on the film. This thin layer is of sufficient thickness so that evaporative drying of the film does not take place while the film strip 22' is moving to the dryer 40, but not so thick that it cannot be completely stripped off the film as a liquid sheet in the dryer, see infra. In addition, when cleaning with the nozzles 36 in operation only about 0.1 gallon of solvent per 1000 feet of film (35 mm.) are lost by atmospheric evaporation, but if operated without the nozzles, about ten times that amount, 10 gallons per 1000 feet of film (35 mm.), would be lost. It will thus be seen, that nozzles 36 are of great significance in the economic feasibility of the invention.

Figure 4:
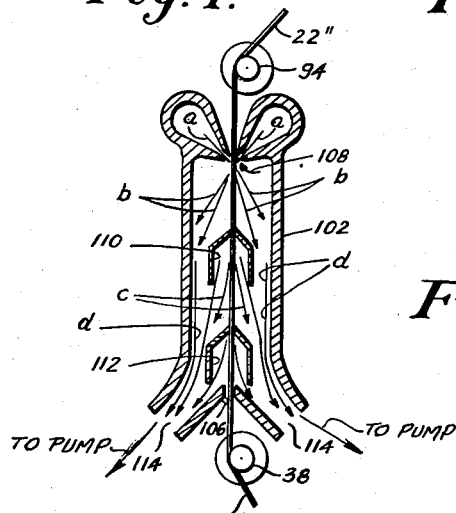
Figure 4 is a cross-sectional view of the novel drier which forms a part of the invention, the cross-section of the drier being the same throughout its transverse dimension.

Referring now to Figure 4, there is generally illustrated in cross-section one form of the drier 40. It will be seen that drier 40 comprises a drying chamber 100 defined by side walls 102 and end walls generally perpendicular thereof, not shown. Conveniently, one end wall may be hinged to facilitate threading of the film through chamber 100. The cross-section of the drier is the same at all lateral points along walls 102. The film strip 22' enters chamber 100 through entry slot 106. Immediately adjacent exit slot 108 are air jet nozzles, connected to a multi-stage centrifugal air compressor, which are arranged generally as shown so as to impinge a high velocity, high volume, warm air jet onto either side of the film strip in a direction angularly opposed to the direction of movement of the film, as indicated generally by lines *a*. When this air jet encounters the wet film at an appropriate angle, it strips or tears the solvent layer off the film surface as a fine liquid spray with essentially complete avoidance of any evaporative removal of solvent from the film surface. The air jet containing the thus produced solvent spray generally follows air stream paths *b* into the chamber. In order to prevent deposition of this spray onto the film surface, baffling vanes 110 and 112 are arranged tandem-wise about the wet moving film strip at spaced points prior to its contact with the air jets. The air stream, carrying the solvent droplets, is then deflected along the air flow path lines *b*, *c* and *d*, induced by baffle vanes 112. The air and its solvent content, now vaporized in the output airstream, is then discharged from the drying chamber through exhaust ports 114. The rapid removal of the air from the drying chamber is assisted by connecting exhaust pumping means (not shown) to exhaust ports 114 to impose a partial vacuum at that end of the drying chamber. Further reference to the design characteristics of this drying chamber will be made hereinafter.

The various elements of the apparatus and steps of the process will now be discussed in somewhat greater detail.

*Design and operation of the cleaning tank*

Since this invention utilizes ultrasonic energy by means of the cavitation phenomena, it is important that cavitation occur at the surface of the film and that the energy be used to the maximum possible extent. These considerations have now been satisfied by so constructing the tank that it may be "tuned" to the ultrasonic frequency contemplated and by passing the film through the energized solvent in a particular path.

As respects the tank design, it may be stated as a general proposition that the propagation of ultrasonic energy follows the usual behavior of sound waves. There will be, consequently, energy maxima and minima, respectively at the loops or crests, and the nodes, in the liquid body through which the wave is passing or in which the standing wave is maintained. Of more direct importance to the present cleaning process and the cavitation effect, is the correlative phenomenon of varying pressures in the liquid or really the alternating pressure amplitudes therein. The maximum alternating pressure amplitude occurs at the nodes and the minimum at the loops of the wave. Cavitation occurs to the greatest extent at the loci of the maximum alternating pressure amplitude, at least within the range of sound energies of practical importance. Hence, at the loops of the sonic wave cavitation will be most violent and of maximum value in the cleaning operation. Keeping in mind that it is necessary that both sides of the film be cleaned and that it is, therefore, desirable to use two opposed transducers on either side of the film strip, one feature of the present invention is to tune the sound frequency generated by the transducers so that substantially standing waves are obtained in the liquid. Not only does this feature avoid loss of power by wave interference destroying the loop structure, but it also establishes fairly fixed discrete regions of maximum alternating pressure amplitude where the ultimate cleaning is achieved.

Figure 6:
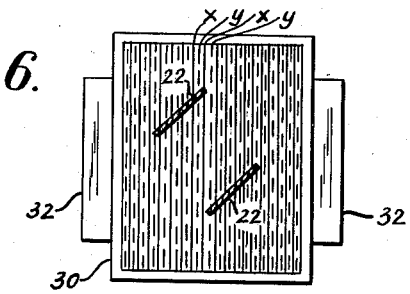
Figures 6 and 7 are schematic diagrams of the manner in which the film passes through the ultrasonically-activated cleaning solvent in this invention, standing ultrasonic waves in the solvent being illustrated as will be hereinafter described.
Figure 7:
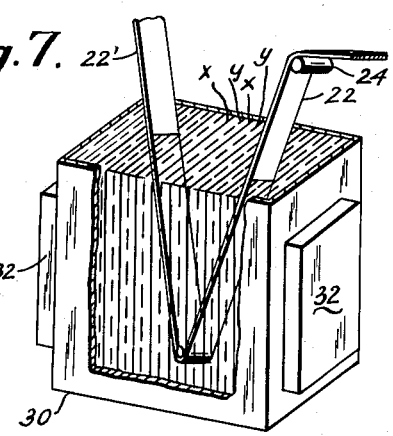

Referring to Figures 6 and 7, which illustrate one possible cleaning tank 30 fitted with opposed transducers or equivalent sonic generators 32, the loops and nodes of sound energy in the standing waves are indicated as $x$ and $y$, respectively. It will be seen that the waves extend vertically and horizontally through the solvent in vertical planes. Overlap of the film strip, entering as 22 and exiting as 22', can be substantially avoided by the use of the helical path previously referred to.

This process of passing the film in a helical path through the tank is arranged so that the plane of the film forms an angle, both horizontally and vertically with the plane of the standing waves. In addition, the downwardly passing film strip 22 does not overlap the upwardly passing strip 22' in the direction of wave propagation. Thus, any shielding of a portion of the film by another section thereof is avoided and the full utilization of the wave energy is achieved.

Alternatively, however, this result can also be achieved by carefully orienting the falling and rising portions 22 and 22' of the film strip in spaced parallel paths, as can be seen from the vertical view of the tank 30 in Figure 8. In this tank design, the film strips 22 and 22', shown in cross-section travel in substantially vertical paths. Here the vertical plane $a$ of tank guide roller 34 is angularly disposed, relative to the propagation vector $b$ of the ultrasonic wave, and is of sufficient diameter, that shadowing by one parallel strip of the film of the other strip is avoided ($\alpha$ may be 30°). The angle $\alpha$ is formed by the intersecting plane $a$ and vector $b$, as clearly shown in Figure 8 of the drawing. At the same time, relative to the standing wave formation generated by transducers 32, each incremental portion of the film strip will encounter a loop in either its downward or its upward journey through the tank.

Further, in Figure 8 there is shown a portion of the mounting cabinet 150 with tank 30, fixed by flange 152 to the shelf 154 of the cabinet by appropriate means, arranged with vertical mount 156 disposed therein. Support 156 extends from above the tank substantially to the bottom thereof and serves to carry the elevator mechanism, including pulley 158 and pulley shaft 160 for raising and lowering roller 34, other details of the elevator mechanism not being shown but generally comprising a chain or belt drive on the pulley and mounting shaft of roller 34 (which is, however, free running), and vertical track means on support 156 for this latter shaft and a suitable driving mechanism turning shaft 160 as desired. In addition, it is preferred to provide for simultaneous elevation and lowering of the spray squeegees to a level in the tank substantially below the upper opening and the solvent level. This cuts down on solvent losses by evaporation, but still permits ready access to the squeegees for adjustment and for cleaning.

Plate member 162 on support member 156 is shown in greater detail at the squeegee operating level in Figures 9 and 10. Plate member 164 in Figure 8 carries the squeegees and is shown in greater detail in Figures 11 and 12. Figures 9 through 12 are discussed hereinafter.

The structure of tank guide roller 34 shown in Figure 8 is also preferred. Flanges 166 and 166' are spaced to carry a wide film, for instance 35 mm. film, and flanges 168 and 168' to carry a narrower film, for instance 16 mm. This arrangement is also carried over to the other guide rollers 24, 26, 38, 42, and 46, and sprocket drive 44 is similarly adapted, so that film strips of different width can be cleaned without changing rollers or sprocket drives.

Thus, according to this invention, the angle of the film transverse to the wave vector and/or the angle of the film strip relative to a vertical plane are carefully selected with reference to the distance travelled in the tank (both in vertical and horizontal components) and the sound frequencies, i.e. wave length, so that each and every segment on each side of the film will be guided at least once through a wave loop or node of pressure maxima. Thus, every element of the film surface will be exposed to a region of maximum cavitation so that the maximum cleaning over the entire film surface is achieved.

*Design and operation of drier*

The above-described process of ultrasonic cleaning of the film will not produce a final product which is completely satisfactory unless the film strip 22' removed from the tank is properly treated so that the solvent thereon is removed without redeposition of dirt. It will be appreciated that of the soil types to be removed from the film the non-filterable small dirt particles and the soluble greases and adhesive tape glues will remain in the solvent in the cleaning tank. As the film is removed from the tank, a certain amount of this solvent will adhere to the surface of the film and, if it is merely evaporated, these soils would, of course, be redeposited on the film surface. Thus, the purpose of the cleaning step would be defeated to this extent.

At the same time, of course, the solvent must be removed from the film and the latter dried so that it may be safely rewound without damage to the emulsion. In order to accomplish this objective, the present invention utilizes in combination with the ultrasonic cleaning tank a particular type of drier. This drier has been generally described above in the discussion of Figure 5. In the design of the drier, certain structural features are particularly important. These include the angle of incidence of the air jets on the film (lines $a$) and the angles formed by the baffle vanes with the plane of the moving film. In addition, the velocity, volume flow, and temperature of the air jet are also important.

In satisfactory operation, the air jet should impinge on the film at an acute angle of from about 75° to 15°, preferably from 30° to 50°, when an air velocity of from 1,000 to 10,000 ft./min. and a film speed of from about 10 ft./min. up to at least 360 ft./min. are used, the latter being greater than any conventional rate of film cleaning. In so operating, the volume of air passing through each jet will be from about 10 to about 100 ft.$^3$/min./in. of film width. When operating within these combined process limitations, the air jet operates substantially completely to literally strip or tear the solvent layer directly off of the surface of the film on which it is carried. It is then removed as a spray into the air stream and the film leaving the jet is quite dry, but completely clean since no evaporation of the dirty solvent has taken place on its surface. In order to prevent redeposition of the droplets of dirty solvent, which are now in the air stream, at least one baffling vane 110 is provided, and preferably two or more, as shown in cross-section in Figure 4. These vanes have three functions: (1) to prevent evaporation of solvent prior to entering the zone of the high velocity air jet, (2) to shield the lower portions of the film which have not yet contacted the air jets from the dirty solvent-spray containing air stream, and (3) also to direct the air stream along path lines $b$ out through the exhaust ports 114. In order to be effective, the angle which the sloping vane surfaces 110' and 112' forms with the plane of the film must be within 15° to 75°, preferably from about 35° to 55° with 45° giving the best results, for the above stated ranges of operation with respect to film speed and air jet velocity and flow volume characteristics. The aperture between the edges of surfaces 110' and 112' and the film must be adequate to prevent contact so that scratching is avoided; however, the drier of this invention generally protects this feature by the opposed substantially equal air pressures exerted on the film. The width of the vane aperture may be about .02 in. to 0.5 in., preferably .03 to 0.1 in., depending on the film speed, air stream velocity and the particular solvent used. This distance permits a certain amount of air flow to pass along path lines $c$ and $d$. Since, however, this air is saturated with solvent vapor and is travelling at a high velocity, its effect is again primarily to strip off the solvent as a liquid. In any event, the saturation of the air stream prevents evaporation of the film in these regions internally of the vane structure so that the redeposition phenomenon is still avoided. To assist maintaining the high velocity air stream throughout the drier, and to aid the removal of the solvent-containing air, the exhaust ports are preferably connected to partial vacuum-inducing pumping means, but this feature is not necessary. Because warm air is used, the initially removed solvent spray droplets will evaporate into the air stream as it passes toward and out through exhaust ports, under the influence of both the temperature and the reduced pressure. Conventional condensers can be used in the air stream to recover this solvent if desired, but as will be hereinafter described, the quantity is sufficiently low so that such loss of solvent, if the condenser is not used, is not serious. Suitable overall height of the drier may be from about 2 to 8 inches from the nozzles 108 to entry slot 104 depending on film width and speed. The length of the drying chamber will be great enough to accommodate the maximum film width to be processed (i.e. up to 90 mm. or more) as desired, and the width of the drying chamber may be from about 1 to about 5 inches or more. Generally, the baffling vanes will extend transversely across the drier chamber and be closed at their ends by the walls thereof. So long as the required features of adequate shielding of the film and proper angles to induce the desired air flow are assured, various specific shapes for the vanes may be used.

The film strip 22" which exits from the drier over guide roller 94 is thoroughly dry and characteristically exhibits a "polished" surface. Dirty solvent spots are noticeably absent and the film is remarkably clean, even when an initially extremely dirty film is employed as will be mentioned hereinafter. A further feature of the drier operation is the fact that, as the film leaves the drier, there is an absence of electrostatic charge. Normally, the photographic film tends to pick up electrostatic charges as it is wound and passed over rollers such as are used in establishing its path through the cleaning tank. However, such charges seem to be completely removed by a grounding phenomenon between the spray and the walls of the drying chamber. That is, as the spray is stripped off the film surface, the droplets apparently carry off any electrostatic charge which has been built up on the film. This is an exceedingly beneficial characteristic of the process and of the drier, when operated and constructed as described above, since it prevents static scratches from developing on the take-up reel. Furthermore, static-free film is less likely to accumulate dirt and dust from its surroundings. It will also be appreciated that any additional "decharging" apparatus is unnecessary in this invention.

While the drier is an important component of the complete ultrasonic cleaning apparatus, and the drying step is an important feature of the ultrasonic cleaning process of this invention, it will be appreciated that the instant drier does have other applications. For instance, it can advantageously be used in film processing, i.e. developing and fixing operations, to effectively remove the chemical solutions when the film is passing from one stage to another, as well as the final drying thereof after development, fixing, and washing have been completed. In this connection, it might be noted that the ultrasonic cleaning tank could also be used during development, fixing, and washing stages since the cavitation phenomenon on the surface of the film would lead to very desirable stirring phenomenon and prevent local concentration build-ups of the exhausted solution which is formed during the chemical reactions taking place. At the same time, in spite of the violence of the cavitation phenomenon, which is sufficient to induce pitting of metal surface, it has been found that the photographic film emulsion and backing are not damaged in any way.

*Design and operation of spray rinse nozzles or squeegees*

In order for the drier to operate properly so that both of the above desired results are achieved, the film must be suitably conditioned after its removal from the tank. As has been mentioned, air squeegees may be used as shown in Figures 2 and 3 to remove a major portion of the solvent. These are operated, however, so that the film does retain a full layer of the liquid solvent on its surface prior to going into the drier. Otherwise, the use of air squeegees would lead to evaporation of the solvent on the film and the purpose of the drier would be defeated. Of course, the action of the air squeegee will lead to solvent losses and, consequently, a further feature of the invention includes combining the function of the air squeegee with the spray rinse. In this embodiment, the apparatus similar to that shown in Figure 1 and as further shown in Figure 8 may be employed but the solvent spray rinse is operated at a high velocity, substantially greater and opposed to the film velocity at a critical angle less than about 25° (when using the solvent specified above). The effect of this high velocity solvent spray, or wet squeegee, is to prevent the major portion of the solvent carried on the film surface from moving upward beyond the level of the squeegee nozzles. By avoiding the use of an air jet, solvent losses are greatly reduced as previously mentioned. The angle of the spray is, however, quite important for, if it were, say, 30°, the downward component of the velocity of the spray would not be sufficient to prevent a backing up of the liquid layer which would then be carried on the film surface above the wet squeegee; therefore, the angle of incidence of the spray with respect to the film is preferably maintained about 10 and 15°. While this method of operation is presently preferred, it will, of course, be appreciated that the invention includes the use of an air squeegee as shown in either Figures 2 and 3, for instance.

Figures 11 and 12 show a preferred squeegee assembly and structure, and will be discussed hereinafter with co-joint reference to Figures 9 and 10 which show the structure of vertical support 156 (see Figure 8) at the squeegee operating height in cleaning tank 30. The squeegee nozzles 170 and 170' are mounted on the front wall 172 of chamber 174 which communicates with circular opening 176 in squeegee plate member 164. This plate member 164 is provided with clamp-shaped flanges 178 adapted to loosely and slidably engage the edge 180 of vertical support plate 162, thereby permitting the squeegee assembly to freely travel up and down on support plate 162. Communicating with chamber 174 are L-shaped conduits 182 and 182', adapted to deliver solvent through openings 184 and 184' on faces 186 and 186' of the squeegee nozzles 170 and 170'.

Solvent for operating the squeegees is delivered by pipe 188 (Figures 9 and 10) to chamber 190 arranged rearwardly of support plate 162 behind resilient disk portion 192, as shown. The resilient disk 192, preferably formed of a material such as Mylar, is provided with a small hole or port 194 adapted to permit solvent to pass outwardly therethrough. However, the delivered solvent pressure in pipe 188 is maintained sufficiently high so that it cannot be entirely relieved by the solvent jet egressing through hole 194, and consequently the pressure build-up behind resilient disk 192 will cause it to expand outwardly and to assume the form of dotted line 196 (Figure 10).

In operation, after the film is loaded on the equipment, and threaded over tank guide roller 34 (Figures 1–3 and 8), the elevator mechanism lowers it from position 34'. The squeegee assembly will initially be out of the tank above roller 34' and will simultaneously slide down on vertical support plate 162 until stopped by lugs 198 and 198', or equivalent means, with disk member 192. At this point, the pump delivering solvent through pipe 188 is turned on (automatically by a switch coupled with the elevator mechanism) and disk 192 expends to line 196, and the periphery 196a will firmly seat against the peripheral surfaces 176a of plate 164 adjacent opening 176. Conveniently, disk 192 may be provided with concentric corrugations to assist the sealing engagement, with port 194 then located in a flat central area of the disk. In this manner, an excellent seal is provided so that there will be no pressure losses between hole 194 and conduit openings 184 and a high velocity solvent jet can be obtained from the latter on squeegee face 186. At the same time, it will be seen that the squeegee assembly is otherwise free to slide upwardly on support plate 162 when the solvent pump is turned off, when the film has been completely removed from reel 20 (Figures 1–3). Actually, clamp-shaped member 178 can be very loosely fitted to the edges 180 and 180' of support plate 162, so that there is considerable play between plate 162 and plate 164, and a tight seal at walls 176a will still be obtained.

It will be clear that the film strip 22' travels upwardly through squeegee nozzles 170 and 170' and the solvent jet is deflected of deflector faces 200 and 200' to spray downwardly and impinge on the film at the critical angle, velocity and volume. Film strip 22' will be maintained spaced from walls 202 and 202' by the positioning of guide rollers 34 and 38, and particularly by the equally opposed forces exerted by the respective solvent sprays from nozzles 170 and 170' so that scratch damage to the film is avoided.

*Tension roller switching arrangement*

In order to insure smooth operation of the film cleaning process, a further feature of the invention is to couple the actuating switching means for take-up reel 50 and sprocket drive 44 with tensioned guide roller 46, and also to incorporate with the latter a general cut-out switch for the entire apparatus. This embodiment will be described with reference to Figure 1, but it will be understood that the same automatic switching system can also be employed with the arrangements shown in Figures 2 and 3.

Referring then to Figure 1, tensioned roller 46 and upwardly tensioned arm 48 opposing the downward force of film strip 22", are shown in the normal running position. During this phase, the tension and torque drive on take-up reel 50 is adjusted so as to provide the optimum winding tension. However, it will be seen that at the start of the operation, which occurs when tank roller 34 reaches its position shown at the bottom of tank 30, and at which time the motor driving sprocket 44 and reel 50 are first turned on, the reel 50 will take a significantly greater time, due to inertia, to reach the film take-up speed equivalent to the linear film speed provided by sprocket drive 44. Thus, a flying loop of film will develop between sprocket 44 and reel 50, and unless this condition is corrected the film will probably lose its threaded position on sprocket 44 and rollers 42 and 46, thus preventing further operation.

To avoid the above events, a cut-off switch for sprocket 44 is associated with tensioned arm 48. When sprocket 44 begins to feed film over roller 46 to reel 50 faster than reel 50 can wind it up, the downward tension on roller 46 is released so that it and arm 48 swing up to positions 46a and 48a. When this happens, the switch cuts off the power to motor driving sprocket 44, but the drive on reel 50 continues. Thus, the feed is stopped until the inertia of reel 50 is overcome at which time the reestablished tension on film strip 22" will return the tensioned guide roller and arm to positions 46 and 48 as shown, reactivating the drive on sprocket 44. While reel 50 assumes the required speed within a couple of seconds, the importance of this switching arrangement to smooth operation of the entire apparatus will be appreciated.

In addition, a master cut-off switch for the entire apparatus is provided when arm 48 is in position 48b. This takes place at the end of a given cleaning operation when the film strip has been removed from supply reel 20, all tension by strip 22" then being released. This master cut-off switch then automatically shuts off the entire apparatus and obviates the necessity of an end-of-the-cycle observation by the operator. In addition, the machine will be shut off in the event of a film breakage.

To maintain the proper tensioned operating position of roller 46 and arm 48, use is made of tensioned roller 26 and arm 28 which controls the electric braking torque on supply reel 20. Various other automatic switching features are also preferred, such as the previously mentioned actuation of the solvent pump by the elevator mechanism after the squeegee assembly (Figures 9–12) is in sealing position; actuation of the transducers and dryer blowers also by the elevator mechanism, while tank roller 34 is still on its downward journey to the operating position, so that full energy will be developed when the film is ready to be run; and automatic actuation of the motors driving sprocket 44 and reel 50 again by the phase of the elevator mechanism, when this latter position of roller 34 is reached.

*Illustrations of the practice and effectiveness of the invention*

The effectiveness of this invention has been very effectively demonstrated by deliberately preparing extraordinarily dirty film. For instance, spliced sections of black and white and color films were copiously spotted with oil and rubber in with fingers to produce heavy finger prints. The contents of an ash tray were distributed heavily over the surface and other portions were marked on with editors' grease pencil. The remaining areas were spotted with adhesive material of Scotch marking tape in amounts sufficient to cause trouble in unreeling the film. This material was applied by soaking the tape in solvent and rubbing the softened adhesive onto the film while still wet. After this treatment, the film was rolled tightly and cinched to assure deep embedment of the more abrasive soils. After treating such dirty film according to this invention, it was found that all of the applied soils were removed except for a few small spots of the tape adhesive and traces of a fluorescent dye which had migrated into the emulsion from the red grease-pencil. It was found that these dye traces do not print in normal process and occur only when certain brands of grease-pencil are employed. As might be expected, the test films were severely scratched during the application of the various soils. Examination of the scratches under a glass showed that the ultrasonic cleaning had not only removed the surface dirt but had also cleaned all soils from within the scratches themselves. The sprocket hole edges were similarly cleaned. Both 16- and 35-millimeter negatives were used in such tests at speeds of about 60 feet per minute.

The removal of the Scotch tape adhesive material was probably incomplete in these tests because, while ultrasonic action effectively detaches these masses from the film, they tend to swell in the solvent, forming relatively large sticky spheroids. These resist complete solution long enough to experience strong untrasonic radiation pressure forces which hold them against the film surface. The use of a pressure spray rinse, as described above with reference to Figure 1, will strip away such loosened soils, returning them to the tank, where they ultimately dissolve. This is an additional function of the high velocity wet spray.

In a further test of the invention, film strips were deeply scratched through the emulsion with a needle and oily cigarette ashes were rubbed in with finger pressure. After dipping a section of this film into ultrasonically activated solvent for two seconds, this dirt was completely removed. In other cases, prepared dirty film, including film marked with difficultly removed soils such as from editors' grease-pencil, have been placed in the cleaning tank with the ultrasonic power turned off. Practically no cleaning effect takes place. When the power is turned on, however, the dirt is seen to erupt suddenly away from the film. This test illustrated that the ultrasonic action was primarily responsible for the cleaning, the solvent characteristics of the liquid employed being important mainly for the solution of the soils after removal from the film surface.

In other tests, film strips were completely cleaned after being pulled rapidly between velvet pads to develop a considerable static charge and then laid on a hall corridor carpet to pick up wool, lint, and sandy dirt. This test illustrated that the ultrasonic cleaning method was effective against dirt held by the electro-static charge.

In another test, the film test strip was liberally spotted on the emulsion side with a non-abrasive emulsion of corn starch and solvent. A small amount of heavy mineral oil was then added to the mixture to bind the starch on the film surface. When the solvent evaporates, this finely divided soil is extremely difficult to remove. The strip was then cleaned according to this invention and complete removal of the soil was observed.

The above tests were carried out using tanks and apparatus having the design characteristics illustrated above and using film speeds of from 30 to 125 feet per minute.

It will be appreciated that within the range of essential characteristics described above, various modifications of this invention may be made without departing from the essential principles thereof. Accordingly, this invention is limited only by the spirit and scope of the following claims.

I claim:

1. A process for the ultrasonic cleaning of photographic film which comprises ultrasonically activating a film-cleaning solvent, passing said film through said solvent, removing clean film from the solvent and thereafter completely stripping the solvent as a liquid from the surface of said film completely covered with a continuous solvent layer, thereby non-evaporatively drying said film surface.

2. The process of claim 1, wherein said solvent is activated by ultrasonic energy continuously generated over a narrow frequency band.

3. The process of claim 1, wherein said solvent is activated by ultrasonic energy generated pulse-wise.

4. The process of claim 1, wherein said solvent is activated by ultrasonic energy generated so as to maintain standing waves in said solvent.

5. A process for the cleaning of dirty photographic film which comprises ultrasonically activating a film-cleaning solvent, passing said film through said solvent and offsetting the movement of said film with respect to the propagation vector of said activation, so that each portion of the film passes through a region of maximum activation in said solvent, removing the cleaned film from said solvent, and thereafter removing the solvent from the surface of said film.

6. Process for cleaning dirty photographic film which comprises delivering said dirty film to an ultrasonically-activated film-cleaning solvent, passing said dirty film through said solvent along a helical path so that each portion of the film passes through at least one of the ultrasonically-produced pressure alternating amplitude maxima.

7. A continuous process for cleaning photographic film by means of ultrasonic energy which comprises continuously passing a strip of dirty photographic film into an ultrasonically activated cleaning solvent, maintaining the entering dirty film and exiting clean film in spaced relationship so that substantial overlap of respective portions of said film in a plane of energy propagation is avoided, and thereafter angularly impinging air jets on opposite sides of said cleaned film so as to remove the solvent therefrom as a liquid, thereby drying said cleaned film while shielding the wet portions of said film prior to contact with said air jets from the ambient atmosphere and from the resulting solvent-containing air stream.

8. Process for the ultrasonic cleaning of photographic film which comprises ultrasonically activating a film-cleaning solvent, passing dirty photographic film through said solvent along a path successively encountering alternating pressure amplitude maxima, removing the clean film from said solvent, angularly impinging a solvent spray onto the surface of said clean film to remove a portion of the solvent contained thereon but leaving an entire layer of said solvent on the film surface, thereafter angularly impinging a high velocity air jet onto the surface of said film thereby stripping substantially said entire layer from said surface as a liquid, while shielding the wet portion of said film prior to contact with said air jet from the ambient atmosphere and from the resulting solvent-containing air stream, and obtaining thereby clean dry photographic film.

9. Apparatus for the ultrasonic cleaning of photographic film which comprises a tank for a suitable cleaning solvent, means for applying ultrasonic energy to said solvent, means for delivering said film to said tank, means for removing said film from said tank, and means for maintaining said film offset to the propagation vector of said ultrasonic energy.

10. Apparatus for the ultrasonic cleaning of photographic film which comprises a supply reel, means for removing film from said supply reel, a tank for a suitable cleaning solvent, means for delivering film to said tank, guide means for maintaining respective portions of said film in said tank in spaced offset relationship, means for removing said film from said tank, means for applying a solvent spray to the surface of the film after its removal from said tank, dryer means for substantially completely removing the solvent from the surface of said film as a liquid, and means for winding the clean film delivered from said dryer means.

11. The apparatus of claim 10, which further comprises a drive wheel for withdrawing said clean, dry film from said dryer means, driving means for said wheel, a take-up reel for winding said clean, dry film, and driving means for said take-up reel, and tensioning means responsive to the tension of said film intermediate said wheel and said takeup reel, and regulatory means coupled to said tensioning means for diminishing the speed of said wheel when the tension of said film is less than a predetermined amount.

12. The apparatus of claim 10, wherein said solvent spray means comprises a pair of opposed spray nozzles communicating with a means for supplying a pressurized solvent, said film passing between said nozzles.

13. The apparatus of claim 12, further comprising elevator means for removing said guide means and said solvent means from said tank, resilient sealing means associated with said elevator means, and means associated with said solvent spray means for receiving said resilient sealing means in the operative sealing relationship.

14. Apparatus for the non-evaporating drying of photographic film surface coated with liquid, which comprises walls defining a drying chamber, wetted film inlet means at one end of said chamber and dry film outlet means at the other end of said chamber, means disposed substantially adjacent said outlet means and adapted for angularly directing an air stream onto the surface of said film, means for shielding wet portions of the film within said chamber from the ambient atmosphere and the resulting solvent-containing air stream, downstream from said air stream, and means for exhausting said air stream from said chamber.

15. Apparatus for the non-evaporative drying of a liquid from the surface of a moving photographic film which comprises in combination walls defining a drying chamber, film entry means permitting continuous introduction of a wet film strip into said chamber and film exit means for permitting the continuous withdrawal of dry film from said chamber, air inlet means for impinging an air blast onto the surfaces of said film inlet adjacent said exit means, the direction of said air blast being angularly opposed to the direction of movement of said film, baffle means within said chamber for deflecting the resulting air stream away from the surface of said film to a region downstream of said air blast, and exhaust means for removing said air stream from said chamber.

16. In the apparatus of claim 15, wherein said discharge means include pumping means for withdrawing said air stream.

17. The apparatus of claim 15, wherein a plurality of said baffle means are employed.

18. The apparatus of claim 15, wherein said baffle means comprise walls extending circumferentially around and spaced away from said film including wall portions inclining in the direction of movement of said film.

19. A process for the ultrasonic cleaning of intelligence-carrying photographic film comprising ultrasonically activating a film-cleaning solvent, passing said intelligence-carrying film through said solvent, thereby cleaning said film, and thereafter completely stripping the solvent as a liquid from the surface of said intelligence-carrying film completely covered with a continuous solvent layer, thereby non-evaporatively drying said film surface.

20. A process for the cleaning of dirty photographic film comprising ultrasonically activating a film-cleaning solvent, passing said film through said solvent in offsetting relationship with respect to the propagation vector of said activation, thereby causing each film portion to pass through a region of maximum activation in said solvent, thereby cleaning said film, removing the cleaned film from said solvent, and thereafter non-evaporatively removing the solvent from said film surface.

21. A process for the ultrasonic cleaning of intelligence-carrying film comprising ultrasonically activating a film-cleaning solvent, passing said intelligence-carrying film through said solvent in offsetting relationship with respect to the propagation vector of said activation, thereby causing each film portion to pass through a region of maximum activation in said solvent, thereby cleaning said film, removing the cleaned film from said solvent, and thereafter non-evaporatively removing the solvent from said film surface.

22. A process for cleaning dirty photographic film which carries intelligence comprising delivering said intelligence-carrying film to an ultrasonically-activated film-cleaning solvent, passing said dirty film through said solvent along a helical path, thereby causing each portion of said film to pass through at least one of the ultrasonically-produced pressure alternating amplitude maxima.

23. A process for the ultrasonic cleaning of intelligence-carrying film comprising ultrasonically activating a film-cleaning solvent, passing said intelligence-carrying film through said solvent along a helical path, thereby causing each portion of said film to pass through at least one of the ultrasonically-produced pressure alternating amplitude maxima, and thereafter non-evaporatively removing the solvent from said film surface, thereby simultaneously cleaning and decharging said film.

24. A continuous process for cleaning intelligence-carrying film by means of ultrasonic energy comprising continuously passing a strip of dirty film carrying intelligence thereon into an ultrasonically activated cleaning solvent, moving said film through said solvent along a helical path, and thereafter angularly impinging air jets onto the surfaces of said film in a direction opposed to said movement while shielding the wet portions of said surfaces prior to contact with said air jets from the resulting solvent-containing air stream, thereby simultaneously cleaning and decharging said film.

25. A process for the ultrasonic cleaning of intelligence-carrying photographic film comprising ultrasonically activating a film-cleaning solvent, passing said film through said solvent, removing clean film from said solvent, and thereafter completely stripping the solvent as a liquid from the film surfaces completely covered with a continuous solvent layer, thereby simultaneously cleaning non-evaporatively, drying and decharging said film.

26. Apparatus for the ultrasonic cleaning of intelligence-carrying film, comprising, in combination, a supply reel, means for removing film from said supply reel, a tank for a suitable cleaning solvent, means for applying ultrasonic energy to said solvent, means for delivering said film to said tank, means for maintaining said film in said tank offset to the propagation vector of said ultrasonic energy, means for removing said film from said tank, means for applying a solvent spray to the film surface, means for the simultaneous decharging and non-evaporative removal of the solvent from the film, and means for winding the clean film delivered from said decharging and non-evaporative solvent removal means.

27. Apparatus for the non-evaporative drying of an intelligence-carrying photographic film surface coated with a cleaning solvent, comprising, in combination, walls defining a drying chamber, wetted film inlet means at one end of said chamber, dry film outlet means at the other end of said chamber, means disposed substantially adjacent said outlet means for angularly directing an air stream onto the surface of said film, and means for shielding met portions of said film from the ambient atmosphere and from the resulting solvent-containing air stream, said shielding means being within said chamber downstream from said air stream, said chamber having air exhaust ports.

28. Apparatus for the non-evaporative drying of a cleaning solvent from the surface of a moving intelligence-carrying photographic film comprising, in combination, walls defining a drying chamber, film entry means for permitting continuous introduction of a wet film strip into said chamber, film exit means for permitting the continuous withdrawal of dry film from said chamber, said film entry means and said film exit means being spaced from said film entering and exiting from, respectively, said chamber, air inlet means for impinging an air blast onto the surface of said film in a direction angularly opposed to the direction of movement of said film, said air inlet means being positioned adjacent said film exit means, and baffle means for deflecting the resulting air stream away from the surface of said film to a region downstream of said air blast, said baffle means being positioned within said chamber, said chamber having air exhaust ports.

(References on following page)

References Cited in the file of this patent

UNITED STATES PATENTS

| | | | |
|---|---|---|---|
| 559,498 | Scharrer | May 5, | 1896 |
| 1,718,063 | Naugle | June 18, | 1929 |
| 1,739,593 | Inglefeld | Dec. 17, | 1929 |
| 2,194,565 | Moss | Mar. 26, | 1940 |
| 2,234,153 | Herbert | Mar. 4, | 1941 |
| 2,264,329 | Offen | Dec. 2, | 1941 |
| 2,289,753 | Capstaff | July 14, | 1942 |
| 2,612,860 | Pendleton | Oct. 7, | 1952 |
| 2,688,333 | Lorig | Sept. 7, | 1954 |
| 2,702,260 | Massa | Feb. 15, | 1955 |
| 2,736,107 | Dungler | Feb. 28, | 1956 |
| 2,748,784 | Kenmore | June 5, | 1956 |
| 2,802,758 | Kearney | Aug. 13, | 1957 |
| 2,894,860 | Engelhardt | July 14, | 1959 |